United States Patent [19]
Larumbe

[11] Patent Number: 6,073,935
[45] Date of Patent: Jun. 13, 2000

[54] LEAKTIGHT SEAL DEVICE FOR LOWER ARM OF A SPARK EROSION MACHINE OR ELECTRICAL DISCHARGE MACHINING (EDM) DEVICE

[75] Inventor: Javier Maidagan Larumbe, Durango, Spain

[73] Assignee: Ona Electro-Erosion, S.A., Spain

[21] Appl. No.: 09/042,874

[22] Filed: Mar. 17, 1998

[51] Int. Cl.[7] .................................. F16J 9/00; F16J 3/00; B23H 1/00; B23K 9/00

[52] U.S. Cl. .......................... 277/435; 277/906; 277/921; 277/634; 219/69.11

[58] Field of Search ..................................... 277/345, 435, 277/441, 489, 906, 921, 634, 637; 219/69.12, 69.11; 267/155, 156, 275, 277

[56] References Cited

U.S. PATENT DOCUMENTS

| | | | |
|---|---|---|---|
| 2,417,482 | 3/1947 | Gacki | 267/155 |
| 3,891,223 | 6/1975 | Sonnen | 277/345 |
| 4,565,915 | 1/1986 | Girardin | 219/69.12 |
| 4,647,747 | 3/1987 | Goto | 219/69.12 |
| 4,808,786 | 2/1989 | Shinkai et al. | 219/69.12 |
| 4,918,279 | 4/1990 | Babel et al. | 219/69.12 |
| 5,171,955 | 12/1992 | Hosaks et al. | 219/69.12 |

Primary Examiner—Anthony Knight
Assistant Examiner—Robert L. Pilaud
Attorney, Agent, or Firm—Bierman, Muserlian and Lucas

[57] ABSTRACT

The leakproof sealing device for the lower arm of a spark erosion machine (also known as an electrical discharge machining (EDM) device) is made to fit a variety of existing spark erosion machines, each having different size windows. A slidable metal band is mounted on the outside of the tank and spans the window. Spring mounted rollers maintain tension on the metal band and allow the metal band to move from side to side across the window. A structural frame mounted external to the tank forms a leaktight seal between the tank and the band. A hole is formed in the metal band through which the lower arm of the erosion machine passes and a semi-leaktight seal is formed between the arm and the metal band.

5 Claims, 2 Drawing Sheets

LEAKTIGHT SEAL DEVICE FOR LOWER ARM OF A SPARK EROSION MACHINE OR ELECTRICAL DISCHARGE MACHINING (EDM) DEVICE

Many spark erosion machines require that the tank in which the process is carried out, which contains a liquid employed for the spark erosion process, be equipped with a window through which the lower arm of the machine can enter the tank.

It is necessary to prevent the liquid in the tank from flowing out through said window, for which purpose many different devices have been designed, one of which is that which is described in U.S. Pat. No. 4,647,747, in which a metal strip is fitted along said window and seals between said strip and the tank wall, in addition to other seals between said strip and the lower arm.

Mention must be made of the fact that the leaktightness problem becomes more highly complicated when the need is entailed of not transferring stress to the lower arm which will involve the least amount of strain and which, on being transferred to the head thereof, gives rise to inaccurate work, when it is commonly known that machining using the spark erosion process is expected to achieve the highest possible degree of precision.

The solution provided by U.S. Pat. No. 4,647,747 entails the extremely serious defect of using a tank which is fitted with some housings built into the inside of the ends of its side walls. One must take into account the thousands of spark erosion machines which are already in use throughout the world and which are in need of a good solution for making their lower arms leaktight.

The solution provided in U.S. Pat. No. 4,647,747 would make it necessary to revamp the structure of the tanks currently in use.

The solution proposed in this invention is based on the idea of in no way whatsoever revamping the structure of any of the tanks currently known, but rather of incorporating an external addition thereto to solve the problem of leaktightness and arm movement without applying any stress thereto.

The addition or device comprising the object of this invention is attached to the outside of a tank currently in use, by means of bolts as one possible alternative, thus being a simple, inexpensive process.

This invention also considers that if the seals are totally leaktight, unwanted stress is transferred onto the lower arm during movement, for which reason a semi-leaktight seal is designed between metal strip and lower arm, and the entire mechanism is fitted with an overflow channel which collects the fluid that seeps out through the leaktight or semi-leaktight seals.

The present invention advocates a leaktight device for the lower arm of a spark erosion machine of the type comprised of a tank in which the process is carried out containing a fluid, a window having been cut into one of the side walls thereof, and using a metal band opposite said window, a hole having been made in the metal band for the purpose of allowing the lower arm of the spark erosion machine to pass through, designed such that on the outside of the tank a) a device for rolling up said metal band is attached to the tank on each side of said window, being comprised of a torsion spring which is affixed to one end of a shaft and, at the other end, to a roller cylinder attached to the metal band and of means for adjusting the tightness of said torsion spring;

b) the window is framed by a structural frame attached to the tank which is comprised of an inner frame and an outer frame which hold a leaktight frame into place between them that is comprised of two half-frames placed opposite one another, each of which is fitted with some rubber seal stripping lips along its edges which rest on the metal band;

c) a semi-leaktight seal fitted around the opening in the metal band which is comprised of an inner flange which holds a ring of alveolar material on a ring-shaped groove, and an outer counterflange which holds a ring of springy material into place up against a cover;

d) a overflow channel positioned below at least along the full length of the window of the tank in which the process is carried out.

It is also characterized because a hole has been placed into the bottom of the counterflange.

For the purpose of providing for a better understanding of the object of the present invention, a preferential embodiment subject to additional changes which do not detract from the fundamentals thereof is shown on the drawings.

Figure 1:
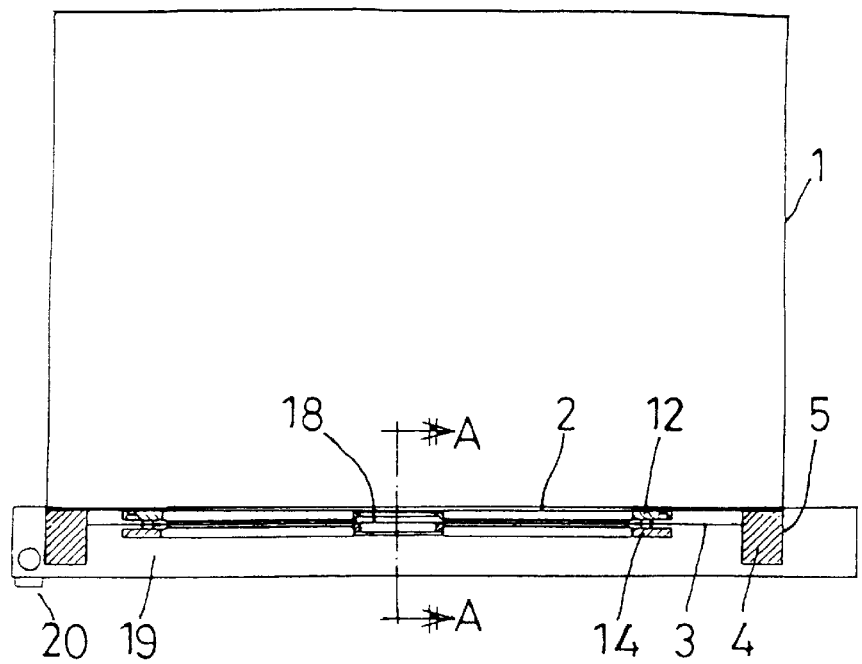
FIG. 1 is a sectional plan view of one embodiment of this invention.
Figure 2:
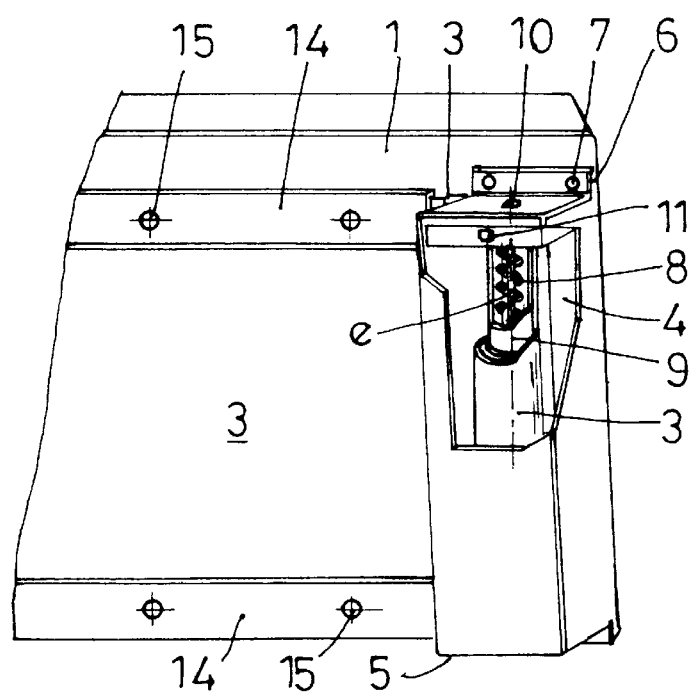
FIG. 2 is a perspective view of one side of FIG. 1 with a cut-away view provided for the purpose of being able to view the spring mechanism.
Figure 3:
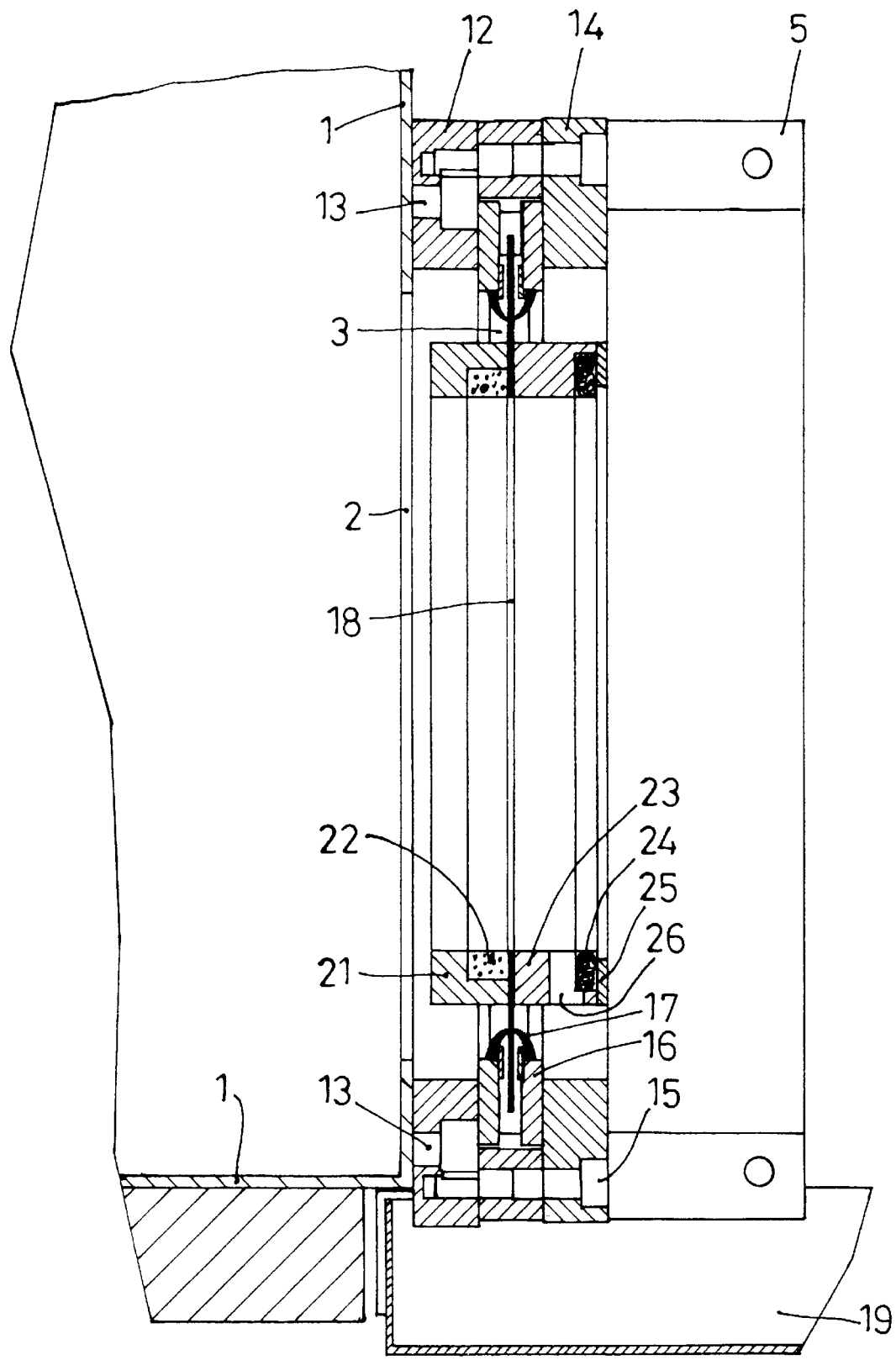
FIG. 3 is a view as per Section A:A of FIG. 1.

A description is provided in the following of one, non-limiting example of an embodiment of the present invention.

A tank (1) containing fluid for electrospark erosion work, with the window (2) cut into one of the side walls thereof to allow the entry and movement of the arm holding the lower head of the electric spark machine, is engineered in a manner already fully known.

Without in any way revamping the tank (1), the device comprising the object of this patent is added to the outside thereof.

A flexible, roll-up stainless steel band (3) is added, each one of the side edges thereof being attached to a rolling device (4) installed inside a U-shaped protection box 5, which, by means of its wings (6), is affixed to the tank (1), by means of bolts (7) as one possible alternative.

The rolling device (4) is comprised of a shaft (e) to which the end of a torsion spring (8) is affixed, the other end of which is secured to a roller cylinder (9) to which the side edge of the band (3) is attached.

The head (10) of the shaft (e) of the roller device (4) is accessible from the outside such that the torsion spring (8) provides a certain preliminary load or one which can be adjusted as desired, the pertinent scaling bolt (11) being installed for the purpose of keeping said shaft in the desired position.

Around the window (2) and on the outside of the tank (1), a structural frame is built, being comprised of an inner frame (12) which is attached to the tank (1) by means of bolts (13), and an outer frame (14), which is attached to the inner frame (12) by means of bolts (15).

Held in place between the inner frame (12) and the outer frame (14) is a leaktight frame comprised of two half-frames (16), each of which ends in rubber sealer strip lips (17) which rest on the band (3) creating a seal which need not necessarily be totally leaktight so that the flange (3) can easily slide between said sealer strips (17), which benefits the movement without excessive, damaging stress, of the lower arm of the machine which enters through a hole (18) in the band (3).

The leaktight seal between the band (3) and the lower arm of the machine is achieved by means of a semi-leaktight seal which allows the partial flowing out of liquid into a collector channel (19) fitted with a drain outlet (20) for the recycling thereof.

The aforesaid semi-leak-tightness allows the lower arm to gently slide into the hole (18), thus preventing unnecessary, damaging stress on said arm.

The semi-leaktight seal is comprised of the inner side of the metal band (3) of a metal flange (21) with a ring-shaped groove for holding a ring (22) made of alveolar polyurethane and, on the outside, is comprised of a counterflange (23) with a frontal ring-shaped groove which holds a ring (24) made of springy material held into place by a cover (25).

At the bottom of the counterflange (23), a bleed hole (26) has been provided to allow the draining of the semi-leaktight seal toward the collector channel (19).

What is claimed is:

1. A leaktight seal device for a lower arm of a spark erosion machine wherein said lower arm extends through a window in a side wall of a tank of said spark erosion machine, said seal device comprising:

a) a flexible, roll-up metal band positioned outside said tank and spanning said window in said side wall, said metal band having a hole through which said lower arm passes from outside said tank to inside said tank;

b) two roller devices installed outside said tank, one attached to each end of said metal band, one of said roller devices installed at one side of said window and the other of said roller devices installed at the other side of said window, said roller devices allowing for lateral movement of said metal band across said window;

c) a structural frame installed outside said tank, framing said window and through which said metal band moves, said structural frame forming a leaktight seal between said tank and said metal band;

d) a semi-leaktight seal installed in said hole in said metal band and forming a semi-leaktight seal between said lower arm and said metal band wherein said semi-leaktight seal comprises an inner flange which holds a ring of alveolar material into place in a ring-shaped groove, and an outer counterflange, which holds a ring of springy material in place up against a cover thereby forming said semi-leaktight seal; and e) an overflow channel installed below said window for catching fluid which leaks from said tank.

2. The device of claim 1 wherein said roller device comprises a torsion spring affixed at one end of a shaft and at the other end to a roller cylinder, said roller cylinder attached to one end of said metal band, and means for adjusting the tightness of said torsion spring.

3. The device of claim 1 wherein said structural frame comprises an inner frame and an outer frame which hold a leaktight frame into place between them, said leaktight frame comprises of two half-frames positioned opposite one another, each one of said half-frames fitted along its edges with a rubber sealer stripping, on which the metal band rests thereby forming said leaktight seal.

4. Leaktight seal device for a lower arm of a spark erosion machine of the type having a tank in which the process is carried out containing a fluid, said tank having side walls wherein one of the side walls is fitted with a window, a metal band installed in said window, a hole having been made in the metal band to allow the lower arm of the spark erosion machine to enter into said tank, said device mounted on the exterior of the tank and comprising:

a) a roller device for rolling up said metal band mounted on each side of said window, said roller device consists of a torsion spring which is affixed at one end to a shaft and, at the other end, to a roller cylinder attached to the metal bands and means for adjusting the tightness of said torsion spring;

b) a structural frame attached to the tank framing the window on the side wall of the tank and which is comprised of an inner frame and an outer frame which holds a leaktight frame into place between them which is comprised of two half-frames positioned opposite one another, each one of which is fitted along its edges with a rubber sealer stripping, on which the metal band rests;

c) a semi-leaktight seal installed around the hole in the metal band which is comprised of an inner flange which holds a ring of alveolar material into place in a ring-shaped groove, and an outer counterflange, which holds a ring of springy material in place up against a cover;

d) a overflow channel installed below at least the full length of the window of the tank in which the process is carried out.

5. Leaktight seal device for lower arm of a spark erosion machine of claim 1 wherein an opening has been placed at the bottom of the counterflange.

\* \* \* \* \*

UNITED STATES PATENT AND TRADEMARK OFFICE
CERTIFICATE OF CORRECTION

PATENT NO : 6,073,935
DATED : June 13, 2000
INVENTOR(S): J. Larumbe

It is certified that error appears in the above-identified patent and that said Letters Patent is hereby corrected as shown below:

Column 4, line 22 (claim 4), change "bands" to --band,--.

Signed and Sealed this

Twentieth Day of March, 2001

Attest:

NICHOLAS P. GODICI

*Attesting Officer*     *Acting Director of the United States Patent and Trademark Office*